United States Patent [19]

Nakajima et al.

[11] 4,434,210

[45] Feb. 28, 1984

[54] MAGNETIC RECORDING MEDIUM

[75] Inventors: Kaoru Nakajima, Izumi; Yoshinobu Ninomiya, Miyagi; Masashi Somezawa, Sendai, all of Japan

[73] Assignee: Sony Corporation, Tokyo, Japan

[21] Appl. No.: 279,726

[22] Filed: Jul. 2, 1981

[30] Foreign Application Priority Data

Jul. 3, 1980 [JP] Japan .................................. 55-90838

[51] Int. Cl.³ .............................................. H01F 10/02
[52] U.S. Cl. .................................... 428/447; 427/44; 428/405; 428/694; 428/900
[58] Field of Search ............... 428/900, 694, 405, 447; 427/130, 127, 35, 44, 36, 128; 252/62.54

[56] References Cited

U.S. PATENT DOCUMENTS 4,225,631  9/1980  Berger et al. ........................ 427/36
4,271,234  6/1981  Schonafinger .................. 428/900 X

*Primary Examiner*—Bernard D. Pianalto
*Attorney, Agent, or Firm*—Hill, Van Santen, Steadman & Simpson

[57] ABSTRACT

A magnetic recording medium having a magnetic layer which is cured by irradiating radiation onto the magnetic layer in which magnetic or magnetizable powder material surface-treated with a silicon compound having a silanol group and/or a silanol-forming group upon hydrolysis and a double-bond sensitive to radiation irradiated is present with a binder. The magnetic recording medium having the aforesaid structure has a sufficient durability.

3 Claims, No Drawings

MAGNETIC RECORDING MEDIUM

BACKGROUND OF THE INVENTION

1. Field of the Invention

The present invention relates to a magnetic recording medium.

2. Brief Description of the Prior Art

An attempt has been made to improve the durability of the magnetic layer on a non-magnetic supporting film by modifying the surface of magnetic or magnetizable powder materials used in the magnetic layer by a treatment with a silane coupling agent. The silane coupling agent is an organic silicon compound having two or more different reactive groups in one molecule. One of the reactive groups is one capable of forming a chemical bond with an inorganic material, that is, magnetic or magnetizable powder material and may include, for example, methoxy, ethoxy and silanol groups. The other is one capable of forming a chemical bond with an organic material and may include, for example, vinyl, epoxy, methacryl, amino and mercapto groups. The silane coupling agent is found effective in treating magnetic or magnetizable powder material itself. It has however drawbacks in association with the binding with the organic material.

The conventional silane coupling agents have been employed only with a limited group of binders. The magnetic layer formed using such silane coupling agent should be treated within a limited range of reaction temperatures because of the heat resistance of a base film, such as a polyester base. Where a catalyst is used to accelerate the reaction, the pot life of a magnetic paint is rendered so short that a problem with its industrial applicability is encountered. A further drawback resides in that where the reactive groups in the silane coupling agent are allowed to react with the organic material in the magnetic paint to form chemical bonds, the orientation of the magnetic or magnetizable powder material is rendered poor.

OBJECTS AND SUMMARY OF THE INVENTION

Therefore, an object of the present invention is to provide a magnetic recording medium in which the magnetic layer provided on a non-magnetic supporting film has an improved durability.

Another object of the present invention is to provide a magnetic recording medium in which the magnetic or magnetizable material used for the formation of the magnetic layer is modified at its surface by the use of a silicon compound having improved characteristics.

In accordance with the present invention, there is provided a magnetic recording medium in which a silicon compound having a silanol group and/or a silanol-forming group upon hydrolysis and a reactive double bond sensitive to radiation is used to subject it to a surface treatment on the magnetic or magnetizable powder material.

DETAILED DESCRIPTION OF THE PREFERRED EMBODIMENTS

A silicon compound to be used in accordance with the present invention for treating the surface of magnetic or magnetizable powder material is the one that has a silanol group and/or a silanol-forming group upon hydrolysis and a reactive double bond which is sensitive to radiation. The silanol group, on the one hand, can form a chemical bond with the hydroxyl group on the surface of a magnetic or magnetizable powder particle. The reactive group, on the other hand, can form a bridging with a binder component by radical polymerization between the radicals generated from the radiation-sensitive reactive double bonds and the binder component upon irradiation of radiation. Accordingly, the silicon compound can serve to bind the magnetic or magnetizable powder material and the binder component, whereby a binding therebetween is improved with the result that the durability of the magnetic layer is enhanced.

The silicon compounds to be used in accordance with the present invention may be represented by the following general formula:

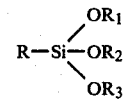

wherein each of $R_1$, $R_2$ and $R_3$ is independently hydrogen, an alkyl group, an alkoxy group, or an alkoxyalkyl group, each having 1 to 4 carbon atoms;

R is an alkenyl group, an alkenylaminoalkyl group, an alkenylaminoalkylaminoalkyl group, or the group Y—CO—X—Z—, wherein X is —O— or —NH—, Y is an alkenyl group, and Z is a single bond or an alkylene group.

The term "alkyl" referred to herein as such or as contained in the alkoxy group in $R_1$, $R_2$ and $R_3$ is a monovalent, straight or branched chained, aliphatic saturated hydrocarbon residue having from 1 to 4 carbon atoms and may include, for example, methyl, ethyl, propyl, isopropyl or butyl. The term "alkoxyalkyl" referred to therein is a group in which an oxygen atom is interposed between the alkyl group referred to hereinabove and may include, for example, methoxymethyl, methoxyethyl, ethoxymethyl or ethoxyethyl. The term "alkenyl" referred to herein as such or as contained in the other expressions in the R group may be a monovalent, straight or branched chained, unsaturated aliphatic hydrocarbon residue having from 2 to 6 carbon atoms and may preferably include those having from 2 to 3 carbon atoms and, more preferably, those of the acrylic type, such as vinyl and 1-methylvinyl. The term "alkylene" referred to herein and the term "alkyl" referred to herein as contained in the other definitions in the R group may be a divalent, straight or branched chained, saturated aliphatic hydrocarbon residue having from 1 to 6 carbon atoms and may include, for example, methylene, ethylene, methylethylene or ethylethylene. It may be noted, however, that the alkyl group which is interrupted by amino group may have up to 6 carbon atoms in total.

Illustrative of representatives of the aforesaid silicon compounds are the following:

vinyltriethoxysilane
$CH_2=CHSi(OC_2H_5)_3$
vinyltris($\beta$-methoxyethoxy)silane
$CH_2=CHSi(OC_2H_4OCH_3)_3$
$\gamma$-acryloxypropyltrimethoxysilane
$CH_2=CHCOOC_3H_6Si(OCH_3)_3$
$\gamma$-methacryloxypropyltrimethoxysilane
$CH_2=C(CH_3)COOC_3H_6Si(OCH_3)_3$ γ-acrylamidopropyltrimethoxysilane
    $CH_2=CHCONHC_3H_6Si(OCH_3)_3$
vinyltris(tert.-butylperoxy)silane
    $CH_2=CHSi(OOC(CH_3)_3)_3$
N-(N-propenylamino-β-ethyl)-γ-aminopropyltrimethoxysilane
    $CH_2=CHCH_2NHC_2H_4NHC_3H_6Si(OCH_3)_3$
N-(N-propenylamino-β-ethyl)-γ-aminopropyltrimethoxysilane hydrochloride
    $CH_2=CHCH_2NHC_2H_4NHC_3H_6Si(OCH_3)_3$ HCl
N-propenylaminopropyltrimethoxysilane
    $CH_2=CHCH_2NHC_3H_6Si(OCH_3)_3$
N-propenylaminopropyltrimethoxysilane hydrochloride
    $CH_2=CHCH_2NHC_3H_6Si(OCH_3)_3$ HCl Among the silicon compounds as hereinabove illustrated, those having the acrylic or methacrylic double bond are preferred.

The aforesaid silicon compounds in which each of the groups $R_1$, $R_2$ and/or $R_3$ is other than hydrogen atom, that is, a silanol-forming group, can be readily converted upong hydrolysis to those in which the groups $R_1$, $R_2$ and $R_3$ are each hydrogen atom, that is, a silanol group. Accordingly, where such silicon compounds having the silanol-forming group is used the compounds can be readily converted to those of the silanol type compounds when they are used with a solvent for forming a magnetic paint, which contains water.

The silicon compounds may be used in the amount ranging from about 0.1 to 10 parts by weight, preferably from about 0.5 to 5 parts by weight, with respect to the weight of the magnetic or magnetizable powder material.

The magnetic or magnetizable particles to be employed for the present invention may include, for example, gamma-hematite (γ-$Fe_2O_3$), magnetite ($Fe_3O_4$), gamma-hematite or magnetite doped with transition metal elements, such as cobalt, iron oxides of non-stoichiometric oxidation compounds between gamma-hematite and magnetite, said iron oxide coated primarily with cobalt oxide or hydroxide, chromium oxide ($CrO_2$) or chromium oxide with $Cr_2O_3$ layer provided on the surface thereof by reduction, magnetic or magnetizable metals or alloys, such as iron, cobalt, nickel, an iron-cobalt alloy (Fe-Co), an iron-cobalt-nickel alloy (Fe-Co-Ni), those containing one or more non-metallic elements or metallic elements, such as a transition metal element; mixtures of the above or other magnetic or magnetizable materials. The magnetic or magnetizable powder material may be subjected to surface treatment by admixture with the silicon compound in the magnetic paint or by admixture with an aqueous solution of the silicon compound, whereby hydrolysis is caused to form a silanol group on the silanol compound having the silanonforming group and simultaneously the silanol group is chemically bridged with a reactive group on the surface of a magnetic or magnetizable powder particle by means of dehydration.

It is preferred to carry out the hydrolysis procedure prior to the surface treatment to provide hydrolysis to a sufficient extent.

The binders to be used in the present invention may include, for example, vinyl chloride copolymers, such as vinyl chloride-vinyl acetate copolymers, vinyl chloride-vinyl acetate-vinyl alcohol copolymers, vinyl chloride-vinyl acetate-maleic acid copolymers, vinyl chloride-vinylidene chloride copolymers, vinyl chloride-acrylonitrile copolymers; acrylic ester or methacrylic ester copolymers, such as acrylic ester-acrylonitrile copolymers, acrylic ester-vinyl chloride copolymers, methacrylic ester-vinylidene chloride copolymers, methacrylic ester-styrene copolymers and the like; thermoplastic polyurethane resins; polyvinyl fluoride; acrylonitrile copolymers, such as acrylonitrile-vinylidene chloride copolymers, acrylonitrile-butadiene copolymers, acrylonitrile-acrylic acid copolymers, acrylonitrile-butadiene-methacrylic acid copolymers and the like; polyvinylbutyral; cellulose derivatives; styrene-butadiene copolymers; polyester resins; phenol resins; epoxy resins; thermosetting polyurethane resins; urea resins; melamine resins; alkyd resins; urea-formaldehyde resins; mixtures of the above and the like.

In addition to those binders as hereinabove mentioned there may also be employed organic binders having a reactive unsaturated hydrocarbon group. They may include, for example, polymer compounds having a reactive unsaturated group in the terminal, the side chain and/or the main chain of the polymer chain, and mixtures of polymer compounds having no reactive unsaturated hydrocarbon group with monomers having a reactive unsaturated hydrocarbon group and/or with prepolymers having a reactive unsaturated hydrocarbon group.

Illustrative of the polymer compounds having a reactive unsaturated group may be, for example, butadiene copolymers, such as polybutadiene, butadiene-acrylonitrile copolymers, butadiene-acrylonitrile-styrene copolymers, butadiene-styrene copolymers and the like; and polyurethane, polyester and other polymer compounds modified at its terminal and/or side chain with a compound having a reactive unsaturated group, e.g., an unsaturated acid, such as acrylic acid, methacrylic acid, crotonic acid, itaconic acid, maleic acid, fumaric acid or the like, an ester or amide thereof, such as 2-hydroxylethyl acrylate, 2-hydroxylethyl methacrylate, 2-hydroxylpropyl acrylate, glycidyl acrylate, glycidyl methacrylate, acrylamide, methacrylamide or the like.

Representative examples of the polymer compounds having no reactive unsaturated group to be employed with such monomers and/or prepolymers may be, for example, polyurethane; vinyl chloride copolymers, such as vinyl chloride-vinyl acetate copolymers, vinyl chloride-vinyl acetate-vinyl alcohol copolymers, vinyl chloride-vinylidene chloride copolymers, vinyl chloride-acrylonitrile copolymers and the like; acrylic ester or methacrylic ester copolymers, such as acrylic ester-acrylonitrile copolymers, acrylic ester-vinylidene chloride copolymers, acrylic ester-styrene copolymers, methacrylic ester-acrylonitrile copolymers, methacrylic ester-vinylidene chloride copolymers, methacrylic ester-styrene copolymers and the like; acrylonitrile copolymers, such as acrylonitrile-vinylidene chloride copolymers, acrylonitrile-butadiene copolymers, acrylonitrile-butadiene-styrene copolymers and the like; polybutadiene and butadiene copolymers, such as butadiene-styrene copolymers and the like; acetal polymers, such as polyvinyl butyral, polyvinyl formal and the like; cellulose derivatives, such as nitrocellulose, cellulose butyrate, cellulose acetate, cellulose propionate and the like; polyesters; phenoxy resins and the like.

The monomers having a reactive unsaturated group to be employed for admixture with the polymer compounds having no reactive unsaturated group may include, for example, a styrene, such as styrene, chlorostyrene, methylstyrene, dimethylstyrene, ethylstyrene or the like; a ketone, such as methylvinylketone, methylisopropenylketone or the like; an unsaturated carboxylic acid, such as acrylic acid, methacrylic acid, maleic anhydride or the like; an acid vinyl ester, such as vinyl acetate, vinyl propionate, vinyl butyrate, isopropenyl acetate, vinyl methoxyacetate or the like; an unsaturated carboxylic acid ester, such as methyl acrylate, methyl methacrylate, ethyl acrylate, ethyl methacrylate, propyl acrylate, propyl methacrylate, butyl acrylate, butyl methacrylate, cyclohexyl acrylate, cyclohexyl methacrylate, benzyl acrylate, benzyl methacrylate, dimethyl fumarate, diethyl fumarate, dimethyl maleate, diethyl maleate or the like; an unsaturated carboxylic acid amide, such as acrylamide, methacrylamide or the like; a nitrile, such as acrylonitrile, methacrylonitrile or the like; or an unsaturated group containing heterocyclic compound, such as vinylpyridine, N-vinylpyrrolidone, N-vinylcarbazole or the like.

The prepolymers having a reactive unsaturated group to be employed for admixture with the polymer compounds having no reactive unsaturated group may include, for example, an alkyleneglycol diacrylate or dimethacrylate, such as ethyleneglycol diacrylate, ethyleneglycol dimethacrylate, 1,3-butyleneglycol diacrylate, 1,3-butyleneglycol dimethacrylate, 1,4-butyleneglycol diacrylate, 1,4-butyleneglycol dimethacrylate, 1,6-hexaneglycol diacrylate, 1,6-hexaneglycol dimethacrylate, neopentylglycol diacrylate, neopentylglycol dimethacrylate, dibromoneopentylglycol diacrylate, dibromoneopentylglycol dimethacrylate or the like; a polyalkyleneglycol diacrylate or dimethacrylate, such as diethyleneglycol diacrylate, diethyleneglycol dimethacrylate, dipropyleneglycol diacrylate, dipropyleneglycol dimethacrylate, dibutyleneglycol dimethacrylate, triethyleneglycol diacrylate, triethyleneglycol dimethacrylate, polyethyleneglycol diacrylate, polyethyleneglycol dimethacrylate, polypropyleneglycol diacrylate, polypropyleneglycol dimethacrylate or the like; a bisphenol diacrylate or dimethacrylate, such as 2,2'-bis(4-acryloxypropoxyphenyl)propane, 2,2'-bis(4-methacryloxypropoxyphenyl)propane, 2,2'-bis(4-acryloxydiethoxyphenyl)propane, 2,2'-bis(4-methacryloxydiethoxyphenyl)propane or the like; a polyalkanolalkane polyacrylate or polymethacrylate, such as trimethylolethane triacrylate, trimethylolethane trimethacrylate, triethanolethane triacrylate, triethanolethane trimethacrylate, trimethylolpropane triacrylate, trimethylolpropane trimethacrylate, tetramethylolmethane tetraacrylate, tetramethylolmethane tetramethacrylate or the like.

Among the aforesaid binders are preferably those having a reactive double-bond, more particularly having the acrylic or methacrylic double-bond.

The solvent to be used for the preparation of a magnetic paint may be, for example, an alcohol, such as methanol, ethanol or the like; a ketone, such as acetone, methylethylketone, methylisobutylketone, cyclohexanone or the like; an ester, such as methyl acetate, ethyl acetate, butyl acetate, ethyl butyrate or the like; a glycolether, such as ethyleneglycol dimethylether, ethyleneglycol monoethylether, dioxane or the like; an aromatic hydrocarbon, such as benzene, toluene, xylene or the like; an aliphatic hydrocarbon, such as hexane, propane or the like; and a mixture of the above.

The magnetic paint to be employed in the present invention may include an abrasive material, such as aluminum oxide, chromium oxide, silicon oxide or the like; an antistatic agent, such as carbon black or the like; and/or a lubricant, such as molybdenum disulfide, graphite, silicone oil, olive oil or the like. Although a dispersing agent such as lecithin or the like may also be employed, the silicon compounds as hereinabove defined can serve as improving the dispersibility of the magnetic or magnetizable powders.

The non-magnetic supporting material to be used as a base may include, for example, a polyester, such as polyethylene terephthalate, a polyolefin, such as polypropylene or the like, a cellulose derivative, such as cellulose triacetate, cellulose diacetate or the like, polycarbonate, polyvinyl chloride, polyimide, a metal, such as aluminum, copper or the like, paper or the like.

The magnetic paint thus prepared may be coated on a non-magnetic supporting material in conventional manner. The magnetic layer coated thereon is then exposed to radiation preferably after drying and calender treatment. It is also possible to subject the magnetic layer to calender treatment after radiation. The radiation to be irradiated on the magnetic layer may be ionizing radiation, such as electron rays, neutron rays, gamma-rays or the like, the electron rays being preferred industrially. The dose amount of irradiation may range from about 1 to 10 Mrad, preferably from about 2 to 7 Mrad. Where an electron ray accelerator is employed, the irradiating energy or accelerating voltage may be above 100 KeV.

With the foregoing general discussion in mind, the following examples are presented to further illustrate to those skilled in the art the manner in which the present invention is carried out. However, the examples are not to be construed as limiting the scope of the invention in any way.

EXAMPLE 1

The magnetic paint having the following composition was prepared by ball-milling it for 72 hours and filtering the resulting mixture through a 3-micron filter.

| Compositions | Amount (% by weight) |
| --- | --- |
| Co-gamma-$Fe_2O_3$ | 100 |
| gamma-methacryloxypropyltrimethoxysilane (KBM 503, manufactured by Shinetsu Kagaku Kogyo K.K.) | 5 |
| vinyl chloride-vinyl acetate copolymer (VAGH, manufactured by Union Carbide Corp.) | 17.5 |
| polyurethane resin (Estane 5702, manufactured by B.F. Goodrich Corp.) | 7.5 |
| $Cr_2O_3$ powders | 3 |
| olive oil | 1 |
| methylethylketone | 150 |
| cyclohexanone | 100 |

The magnetic paint was coated on the film of a polyester film having the thickness of 16 microns so as to form a magnetic layer having the thickness of 6 microns which in turn was dried and subjected to calender treatment. The irradiation of electron rays was conducted on the coating in the dose amount of 4 Mrad with 150 KeV.

EXAMPLE 2

Co-gamma-$Fe_2O_3$ was surface-treated with 5% gamma-methacryloxypropyltrimethoxysilane in water and the particles were dried in the air. After thermal treatment at 100° C. for 1 hour, the powders were used in place of the magnetic powders and the silane compound used in Example 1 to produce a magnetic tape in substantially the same manner as in Example 1.

EXAMPLE 3

The procedure of Example 1 was followed with the exception that, in place of the binder components of Example 1, there was used the binder having the following composition:

| Components | Amount (% by weight) |
|---|---|
| oligoacrylate (M-8030, manufactured by Toa Gosei Kagaku K.K.; prepolymer having 3 double bonds and molecular weight of 2,000) | 10 |
| polyurethane resin (Estane 5702) | 15 |

Each of the magnetic tape obtained in Examples 1 through 3 was cut into a half inch before and after the irradiation of electron rays. The tape was then recorded with video signals in 4.5 MHz and measured for output attenuation after 100 runnings. The results are shown in a table below.

TABLE

| Examples | Time of Preparing Tape | Output Attenuation (dB) |
|---|---|---|
| Example 1 | Before irradiation | −3.5 |
| Example 1 | After irradiation | −1.5 |
| Example 2 | Before irradiation | −3.0 |
| Example 2 | After irradiation | −1.0 |
| Example 3 | Before irradiation | Stopped running with no measurement possible |
| Example 3 | After irradiation | −1.0 |

It is apparent from the table above that the irradiation of electron rays gave the effect to a remarkable extent.

REFERENCE EXAMPLE

A paint having the following composition was prepared and used for the preparation of a magnetic tape as follows:

| Components | Amount (% by weight) |
|---|---|
| goethite | 100 |
| gamma-methacryloxypropyltrimethoxysilane | 5 |
| polyurethane resin (Estane 5702) | 50 |
| epoxy resin (Epiclon 351, manufactured by Dai-Nippon Ink & Chemical Co., Ltd.) | 50 |
| methylethylketone | 400 |
| toluol | 400 |

The mixture of the components as above was admixed well and coated on the rear surface of a polyester film as a back coat. After drying, it was irradiated with electron rays in the same manner as in Example 1. The surface of the film was provided with a usual magnetic layer. Then, the backcoat was measured for the amount of powders rubbed off from the backcoat and it was found that the amount of rubbed-off powders was apparently decreased as compared with the case where no silane compound as mentioned herein was employed. In this case, $Al_2O_3$, $TiO_2$ or the like may be employed likewise as a non-magnetic powder material for a backcoat.

What is claimed is:

1. A magnetic recording medium comprising a magnetic layer in which magnetic or magnetizable powder material surface-treated with a silicon compound having a silanol group and/or a silanol-forming group upon hydrolysis and a double-bond sensitive to radiation and a binder are present therein, said silicon compound having been sufficiently irradiated to form an enhanced binding between the magnetic or magnetizable powder material and the binder, and said silicon compound being bonded to said magnetic or magnetizable powder by a chemical reaction between the silanol group and the surfaces of said powder.

2. The magnetic recording medium according to claim 1, wherein the silicon compound is represented by the formula:

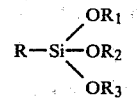

in which each of $R_1$, $R_2$ and $R_3$ is independently hydrogen, an alkyl group, an alkoxy group, or an alkoxyalkyl group, each having 1 to 4 carbon atoms;

R is an alkenyl group, an alkenylaminoalkyl group, an alkenylaminoalkylaminoalkyl group, or the group Y—CO—X—Z—, wherein X is —O— or —NH—, Y is an alkenyl group, and Z is a single bond or an alkylene group.

3. The magnetic recording according to claim 2, wherein each of $R_1$, $R_2$ and $R_3$ is independently methyl and R is the group Y—CO—X—Z—, in which Y is isopropenyl, X is propylene, and Z is a single bond.

* * * * *